(12) United States Patent
Gomez

(10) Patent No.: US 11,898,589 B2
(45) Date of Patent: Feb. 13, 2024

(54) BARREL NUT ASSEMBLY AND METHOD TO ATTACH A BARREL TO A FIREARM USING SUCH ASSEMBLY

(71) Applicant: LWRC International LLC, Cambridge, MD (US)

(72) Inventor: Jesus S. Gomez, Trappe, MD (US)

(73) Assignee: LWRC International LLC, Cambridge, MD (US)

( * ) Notice: Subject to any disclaimer, the term of this patent is extended or adjusted under 35 U.S.C. 154(b) by 211 days.

(21) Appl. No.: 17/071,711

(22) Filed: Oct. 15, 2020

(65) Prior Publication Data

US 2021/0270307 A1   Sep. 2, 2021

Related U.S. Application Data

(62) Division of application No. 15/811,404, filed on Nov. 13, 2017, now Pat. No. 10,808,748, which is a
(Continued)

(51) Int. Cl.
*F41A 21/48* (2006.01)
*F16B 37/00* (2006.01)

(52) U.S. Cl.
CPC ............. *F16B 37/00* (2013.01); *F41A 21/48* (2013.01); *Y10T 29/49963* (2015.01)

(58) Field of Classification Search
CPC .... F41A 5/18; F41A 21/48–487; F16B 37/00; Y10T 29/49963
(Continued)

(56) References Cited

U.S. PATENT DOCUMENTS

| 16,277 A | 12/1856 | Heckendorn |
| 16,916 A | 3/1857 | Gardiner |
| (Continued) | | |

FOREIGN PATENT DOCUMENTS

| WO | WO-95/08090 | 3/1995 |
| WO | WO-2008/108804 | 9/2008 |

OTHER PUBLICATIONS

U.S. Pat. No. 10,697,726, Jun. 30, 2020, Gomez.
(Continued)

*Primary Examiner* — Joshua E Freeman
*Assistant Examiner* — Benjamin S Gomberg
(74) *Attorney, Agent, or Firm* — Arnall Golden Gregory LLP

(57) ABSTRACT

A barrel nut assembly for use on a variety of firearms is provided. The assembly is made up of a barrel nut, generally cylindrical in shape with a threaded central bore, and an externally threaded locknut which is used in conjunction with the barrel nut to secure a barrel to a firearm upper receiver. The barrel nut has an integral bushing on its exterior constructed to support either the gas tube or piston of the host firearm's operating system. The barrel nut is configured so that it may be independently and non-rotationally held within a vice or other fixture during installation of the barrel and while the locknut is tightened to a preset torque to hold the barrel in place. The barrel nut assembly affords the user a method and apparatus that aligns a central bore in the bushing with the opening in the upper receiver that receives an operating system component of the firearm while the barrel nut is independent of the torque applied to the locknut to properly secure the barrel to the upper receiver.

10 Claims, 12 Drawing Sheets

Related U.S. Application Data division of application No. 13/562,651, filed on Jul. 31, 2012, now Pat. No. 9,816,546.

(58) Field of Classification Search
USPC .......................................... 42/75.02, 94, 108
See application file for complete search history.

(56) References Cited

U.S. PATENT DOCUMENTS

| | | |
|---|---|---|
| 894,530 A | 7/1908 | Punches |
| 1,348,702 A | 8/1920 | Gabbett-Fairfax |
| 1,348,733 A | 8/1920 | Pedersen |
| 1,384,161 A | 7/1921 | Schwinzer |
| 1,568,005 A | 12/1925 | Sutter |
| 1,737,974 A | 12/1929 | Pedersen |
| 1,797,951 A | 3/1931 | Gaidos |
| 1,994,489 A | 3/1935 | Simpson |
| 2,090,656 A | 8/1937 | Williams |
| 2,100,410 A | 11/1937 | Pugsley |
| 2,137,491 A | 11/1938 | Huff |
| 2,275,213 A | 3/1942 | Wise |
| 2,336,146 A | 12/1943 | Williams |
| 2,377,692 A | 6/1945 | Johnson, Jr. |
| 2,424,194 A | 7/1947 | Sampson et al. |
| 2,426,563 A | 8/1947 | Patchett |
| 2,482,758 A | 9/1949 | Gaidos |
| 2,532,794 A | 12/1950 | Teece |
| 2,611,297 A | 9/1952 | Simpson |
| 2,655,754 A | 10/1953 | Brush |
| 2,858,741 A | 11/1958 | Simpson |
| 2,872,849 A | 2/1959 | Simpson |
| 2,910,795 A | 11/1959 | Agren |
| 2,952,934 A | 9/1960 | Yovanovitch |
| 2,971,441 A | 2/1961 | Reed |
| 3,027,672 A | 4/1962 | Sullivan |
| 3,137,958 A | 6/1964 | Lewis et al. |
| 3,176,424 A | 4/1965 | Hoge |
| 3,301,133 A | 1/1967 | Sturtevant |
| 3,366,011 A | 1/1968 | Sturtevant |
| 3,446,114 A | 5/1969 | Ketterer |
| 3,453,762 A | 7/1969 | Fremont |
| 3,570,162 A | 3/1971 | Suddarth |
| 3,618,455 A | 11/1971 | Plumer et al. |
| 3,618,457 A | 11/1971 | Miller |
| 3,630,119 A | 12/1971 | Perrine |
| 3,636,647 A | 1/1972 | Goldin |
| 3,675,534 A | 7/1972 | Beretta |
| 3,771,415 A | 11/1973 | Into et al. |
| 3,776,095 A | 12/1973 | Atchisson |
| 3,803,739 A | 4/1974 | Haines et al. |
| 3,857,323 A | 12/1974 | Ruger et al. |
| 3,869,961 A | 3/1975 | Kawamura |
| 3,977,296 A | 8/1976 | Silsby et al. |
| 4,016,667 A | 4/1977 | Forbes |
| 4,028,993 A | 6/1977 | Reynolds |
| 4,057,003 A | 11/1977 | Atchisson |
| 4,128,042 A | 12/1978 | Atchisson |
| 4,226,041 A | 10/1980 | Goodworth |
| 4,231,177 A | 11/1980 | Foote |
| 4,244,273 A | 1/1981 | Langendorfer, Jr. et al. |
| 4,246,830 A | 1/1981 | Krieger |
| 4,279,191 A | 7/1981 | Johansson |
| 4,416,186 A | 11/1983 | Sullivan |
| 4,433,610 A | 2/1984 | Tatro |
| 4,475,437 A | 10/1984 | Sullivan |
| 4,502,367 A | 3/1985 | Sullivan |
| 4,503,632 A | 3/1985 | Cuevas |
| 4,505,182 A | 3/1985 | Sullivan |
| 4,553,469 A | 11/1985 | Atchisson |
| 4,563,937 A | 1/1986 | White |
| H107 H | 8/1986 | Bauer |
| D285,236 S | 8/1986 | Brunton |
| 4,654,993 A | 4/1987 | Atchisson |
| 4,658,702 A | 4/1987 | Tatro |
| 4,663,875 A | 5/1987 | Tatro |
| 4,677,897 A | 7/1987 | Barrett |
| 4,688,344 A | 8/1987 | Kim |
| 4,693,170 A | 9/1987 | Atchisson |
| 4,702,146 A | 10/1987 | Ikeda et al. |
| 4,735,007 A | 4/1988 | Gal |
| 4,765,224 A | 8/1988 | Morris |
| 4,872,279 A | 10/1989 | Boat |
| 4,893,426 A | 1/1990 | Bixler |
| 4,893,547 A | 1/1990 | Atchisson |
| 5,038,666 A | 8/1991 | Major |
| 5,117,735 A | 6/1992 | Flashkes |
| 5,173,564 A | 12/1992 | Hammond, Jr. |
| 5,183,959 A | 2/1993 | McCoan et al. |
| 5,198,600 A | 3/1993 | E'Nama |
| 5,272,956 A | 12/1993 | Hudson |
| 5,343,650 A | 9/1994 | Swan |
| 5,351,598 A | 10/1994 | Schuetz |
| 5,412,895 A * | 5/1995 | Krieger ................ F41A 21/482 89/14.05 |
| 5,448,940 A | 9/1995 | Schuetz et al. |
| 5,452,534 A | 9/1995 | Lambie |
| 5,551,179 A | 9/1996 | Young |
| 5,565,642 A | 10/1996 | Heitz |
| 5,590,484 A | 1/1997 | Mooney et al. |
| 5,634,288 A | 6/1997 | Martel |
| 5,678,343 A | 10/1997 | Menges et al. |
| 5,726,377 A | 3/1998 | Harris et al. |
| 5,770,814 A | 6/1998 | Ealovega |
| 5,806,224 A | 9/1998 | Hager |
| 5,826,363 A | 10/1998 | Olson |
| 5,827,992 A | 10/1998 | Harris et al. |
| 5,900,577 A | 5/1999 | Robinson et al. |
| 5,907,919 A | 6/1999 | Keeney |
| 6,019,024 A | 2/2000 | Robinson et al. |
| 6,070,352 A | 6/2000 | Daigle |
| 6,071,523 A | 6/2000 | Mehta et al. |
| 6,134,823 A | 10/2000 | Griffin |
| 6,182,389 B1 | 2/2001 | Lewis |
| 6,227,098 B1 | 5/2001 | Mason |
| 6,311,603 B1 | 11/2001 | Dunlap |
| 6,382,073 B1 | 5/2002 | Beretta |
| 6,418,655 B1 | 7/2002 | Kay |
| 6,508,027 B1 | 1/2003 | Kim |
| 6,536,153 B2 | 3/2003 | Lindsey |
| 6,564,492 B2 | 5/2003 | Weldle et al. |
| 6,606,812 B1 | 8/2003 | Gwinn, Jr. |
| 6,634,274 B1 | 10/2003 | Herring |
| 6,651,371 B2 | 11/2003 | Fitzpatrick et al. |
| 6,655,069 B2 | 12/2003 | Kim |
| 6,655,372 B1 | 12/2003 | Field et al. |
| 6,668,815 B1 | 12/2003 | Fernandez |
| 6,671,990 B1 | 1/2004 | Booth |
| 6,681,677 B2 | 1/2004 | Herring |
| 6,718,680 B2 | 4/2004 | Roca et al. |
| 6,722,255 B2 | 4/2004 | Herring |
| 6,792,711 B2 | 9/2004 | Battaglia |
| 6,820,533 B2 | 11/2004 | Schuerman |
| 6,829,974 B1 | 12/2004 | Gwinn, Jr. |
| 6,848,351 B1 | 2/2005 | Davies |
| 6,851,346 B1 | 2/2005 | Herring |
| 6,901,691 B1 | 6/2005 | Little |
| 6,945,154 B1 | 9/2005 | Luth |
| 6,959,509 B2 | 11/2005 | Vais |
| 6,971,202 B2 | 12/2005 | Bender |
| 7,036,259 B2 | 5/2006 | Beretta |
| 7,082,709 B2 | 8/2006 | Lindsey |
| 7,131,228 B2 | 11/2006 | Hochstrate et al. |
| 7,137,217 B2 | 11/2006 | Olson et al. |
| 7,162,822 B1 | 1/2007 | Heayn et al. |
| 7,213,498 B1 | 5/2007 | Davies |
| 7,216,451 B1 | 5/2007 | Troy |
| 7,219,462 B2 | 5/2007 | Finn |
| 7,231,861 B1 | 6/2007 | Gauny et al. |
| 7,243,453 B2 | 7/2007 | McGarry |
| 7,299,737 B2 | 11/2007 | Hajjar et al. |
| 7,313,883 B2 | 1/2008 | Leitner-Wise |
| 7,316,091 B1 | 1/2008 | Desomma |
| 7,398,616 B1 | 7/2008 | Weir |
| 7,428,795 B2 | 9/2008 | Herring |

(56) References Cited

U.S. PATENT DOCUMENTS

| | | |
|---|---|---|
| 7,444,775 B1 | 11/2008 | Schuetz |
| 7,461,581 B2 | 12/2008 | Leitner-Wise |
| 7,478,495 B1 | 1/2009 | Alzamora et al. |
| 7,497,044 B2 | 3/2009 | Cammenga et al. |
| D590,473 S | 4/2009 | Fitzpatrick et al. |
| 7,533,598 B1 | 5/2009 | Murphy |
| D603,012 S | 10/2009 | Fitzpatrick et al. |
| 7,596,900 B2 | 10/2009 | Robinson et al. |
| 7,634,959 B2 | 12/2009 | Frickey |
| 7,661,219 B1 | 2/2010 | Knight, Jr. et al. |
| 7,698,844 B2 | 4/2010 | Gruber et al. |
| 7,707,762 B1 | 5/2010 | Swan |
| 7,715,865 B2 | 5/2010 | Camp, Jr. |
| 7,716,865 B2 | 5/2010 | Daniel et al. |
| 7,735,410 B2 | 6/2010 | Clark |
| 7,743,542 B1 | 6/2010 | Novak |
| 7,762,018 B1 | 7/2010 | Fitzpatrick et al. |
| 7,775,150 B2 | 8/2010 | Hochstrate et al. |
| 7,784,211 B1 | 8/2010 | Desomma |
| 7,793,453 B1 | 9/2010 | Sewell, Jr. et al. |
| 7,806,039 B1 | 10/2010 | Gomez |
| 7,827,722 B1 | 11/2010 | Davies |
| 7,832,326 B1 | 11/2010 | Barrett |
| 7,886,470 B1 | 2/2011 | Doiron |
| D636,043 S | 4/2011 | Olsen et al. |
| 7,930,968 B2 | 4/2011 | Giefing |
| 7,963,203 B1 | 6/2011 | Davies |
| 7,966,760 B2 | 6/2011 | Fitzpatrick et al. |
| 7,966,761 B1 | 6/2011 | Kuczynko et al. |
| D641,451 S | 7/2011 | Gomez et al. |
| 7,975,595 B2 | 7/2011 | Robinson et al. |
| 8,037,806 B2 | 10/2011 | Davies |
| 8,051,595 B2 | 11/2011 | Hochstrate et al. |
| 8,056,460 B2 | 11/2011 | Herring |
| 8,061,072 B1 | 11/2011 | Crose |
| 8,069,604 B2 | 12/2011 | Larue |
| 8,109,193 B2 | 2/2012 | Herring |
| 8,141,285 B2 | 3/2012 | Brown |
| 8,141,289 B2 | 3/2012 | Gomez et al. |
| 8,181,563 B1 | 5/2012 | Peterken |
| 8,186,090 B2 | 5/2012 | Chiarolanza et al. |
| 8,209,896 B1 | 7/2012 | Cashwell |
| 8,234,808 B2 | 8/2012 | Lewis et al. |
| 8,245,427 B2 | 8/2012 | Gomez |
| 8,245,429 B2 | 8/2012 | Kuczynko et al. |
| D668,311 S | 10/2012 | Rogers et al. |
| 8,307,750 B2 | 11/2012 | Vuksanovich et al. |
| D674,859 S | 1/2013 | Robbins et al. |
| 8,341,868 B2 | 1/2013 | Zusman |
| 8,342,075 B2 | 1/2013 | Gomez |
| 8,375,616 B2 | 2/2013 | Gomez et al. |
| 8,387,513 B2 | 3/2013 | Gomez et al. |
| 8,393,107 B2 | 3/2013 | Brown |
| 8,397,415 B2 | 3/2013 | Laney et al. |
| 8,418,389 B1 | 4/2013 | Lukman et al. |
| 8,434,252 B2 | 5/2013 | Holmberg |
| 8,468,929 B2 | 6/2013 | Larson et al. |
| 8,479,429 B2 | 7/2013 | Barrett et al. |
| 8,516,731 B2 | 8/2013 | Cabahug et al. |
| 8,539,708 B2 * | 9/2013 | Kenney ............. F41A 21/482 42/75.01 |
| 8,561,335 B2 * | 10/2013 | Brown ............. F41C 23/16 42/71.01 |
| 8,631,601 B2 | 1/2014 | Langevin et al. |
| 8,689,477 B2 | 4/2014 | Gomez et al. |
| 8,689,672 B2 | 4/2014 | Cassels |
| 8,726,559 B1 | 5/2014 | Mueller |
| 8,746,125 B2 | 6/2014 | Gomez et al. |
| 8,769,855 B2 | 7/2014 | Law |
| 8,783,159 B2 | 7/2014 | Gomez et al. |
| 8,806,792 B2 | 8/2014 | Yan et al. |
| 8,806,793 B2 | 8/2014 | Daniel et al. |
| D712,998 S | 9/2014 | Gomez |
| 8,844,424 B2 | 9/2014 | Gomez |
| 8,863,426 B1 | 10/2014 | Zinsner |
| 8,887,426 B2 | 11/2014 | Feese et al. |
| 8,899,142 B1 | 12/2014 | Cassels |
| 8,943,947 B2 | 2/2015 | Gomez |
| 8,950,312 B2 | 2/2015 | Gomez |
| 8,955,422 B1 | 2/2015 | Schumacher |
| 8,966,800 B1 | 3/2015 | Olson |
| 8,978,284 B1 | 3/2015 | Zusman |
| 9,010,009 B2 | 4/2015 | Buxton |
| 9,038,304 B1 | 5/2015 | Hu |
| D735,288 S | 7/2015 | Gomez |
| 9,103,611 B2 | 8/2015 | Neitzling |
| 9,121,663 B2 | 9/2015 | Troy et al. |
| 9,140,506 B2 | 9/2015 | Gomez |
| 9,234,713 B1 | 1/2016 | Olson |
| 9,261,324 B1 | 2/2016 | Liang et al. |
| 9,291,414 B2 | 3/2016 | Gomez |
| 9,297,609 B2 | 3/2016 | Burt |
| 9,316,459 B2 | 4/2016 | Troy et al. |
| 9,347,738 B1 | 5/2016 | Schumacher |
| 9,395,148 B1 | 7/2016 | Huang |
| 9,404,708 B1 | 8/2016 | Chow et al. |
| 9,506,711 B2 * | 11/2016 | Gomez ............. F41A 21/48 |
| 9,625,232 B2 | 4/2017 | Gomez |
| 9,658,011 B2 | 5/2017 | Gomez |
| 9,766,034 B2 | 9/2017 | Huang et al. |
| 9,772,150 B2 | 9/2017 | Gomez |
| 9,810,495 B2 | 11/2017 | Gomez |
| 9,816,546 B2 * | 11/2017 | Gomez ............. F16B 37/00 |
| 9,857,129 B1 | 1/2018 | Kelly et al. |
| 9,915,497 B2 | 3/2018 | Gomez |
| 10,054,394 B2 | 8/2018 | Jen et al. |
| 10,060,699 B1 | 8/2018 | Hu |
| 10,240,883 B2 | 3/2019 | Gomez |
| 10,309,739 B2 | 6/2019 | Gomez |
| 10,323,891 B1 | 6/2019 | Zheng |
| 10,532,447 B2 | 1/2020 | Hamby |
| 10,591,245 B2 | 3/2020 | Gomez |
| 10,690,425 B2 | 6/2020 | Cassels |
| 10,808,748 B2 * | 10/2020 | Gomez ............. F16B 37/00 |
| 2003/0089014 A1 | 5/2003 | Schuerman |
| 2003/0101631 A1 | 6/2003 | Fitzpatrick et al. |
| 2003/0110675 A1 | 6/2003 | Garrett et al. |
| 2003/0126781 A1 | 7/2003 | Herring |
| 2003/0136041 A1 | 7/2003 | Herring |
| 2004/0020092 A1 | 2/2004 | Christensen |
| 2004/0049964 A1 | 3/2004 | Vais |
| 2004/0055200 A1 | 3/2004 | Fitzpatrick et al. |
| 2005/0011345 A1 | 1/2005 | Herring |
| 2005/0011346 A1 | 1/2005 | Wolff et al. |
| 2005/0016374 A1 | 1/2005 | Pescini |
| 2005/0115140 A1 | 6/2005 | Little |
| 2005/0183310 A1 | 8/2005 | Finn |
| 2005/0183317 A1 | 8/2005 | Finn |
| 2005/0188590 A1 | 9/2005 | Baber et al. |
| 2005/0223613 A1 | 10/2005 | Bender |
| 2005/0262752 A1 | 12/2005 | Robinson et al. |
| 2006/0026883 A1 | 2/2006 | Hochstrate et al. |
| 2006/0065112 A1 | 3/2006 | Kuczynko et al. |
| 2006/0283067 A1 | 12/2006 | Herring |
| 2007/0012169 A1 | 1/2007 | Gussalli Beretta et al. |
| 2007/0033850 A1 | 2/2007 | Murello et al. |
| 2007/0033851 A1 | 2/2007 | Hochstrate et al. |
| 2007/0051236 A1 | 3/2007 | Groves et al. |
| 2007/0199435 A1 | 8/2007 | Hochstrate et al. |
| 2007/0234897 A1 | 10/2007 | Poff |
| 2008/0016684 A1 | 1/2008 | Olechnowicz et al. |
| 2008/0029076 A1 | 2/2008 | Liang |
| 2008/0092422 A1 | 4/2008 | Daniel et al. |
| 2008/0092733 A1 | 4/2008 | Leitner-Wise et al. |
| 2008/0276797 A1 | 11/2008 | Leitner-Wise |
| 2009/0000173 A1 | 1/2009 | Robinson et al. |
| 2009/0007477 A1 | 1/2009 | Robinson et al. |
| 2009/0031606 A1 | 2/2009 | Robinson et al. |
| 2009/0031607 A1 | 2/2009 | Robinson et al. |
| 2009/0107023 A1 | 4/2009 | Murphy |
| 2009/0151213 A1 | 6/2009 | Bell |
| 2009/0178325 A1 | 7/2009 | Veilleux |
| 2010/0071246 A1 | 3/2010 | Vesligai |
| 2010/0122483 A1 | 5/2010 | Clark |

(56) References Cited

U.S. PATENT DOCUMENTS

| | | |
|---|---|---|
| 2010/0126054 A1 | 5/2010 | Daniel et al. |
| 2010/0154275 A1 | 6/2010 | Faifer |
| 2010/0162604 A1 | 7/2010 | Dubois |
| 2010/0186276 A1 | 7/2010 | Herring |
| 2010/0205846 A1 | 8/2010 | Fitzpatrick et al. |
| 2010/0236394 A1 | 9/2010 | Gomez |
| 2010/0242334 A1 | 9/2010 | Kincel |
| 2010/0269682 A1 | 10/2010 | Vuksanovich et al. |
| 2010/0281734 A1 | 11/2010 | Rousseau et al. |
| 2010/0287808 A1 | 11/2010 | King |
| 2010/0313459 A1 | 12/2010 | Gomez |
| 2010/0319231 A1 | 12/2010 | Stone et al. |
| 2010/0319527 A1 | 12/2010 | Giefing |
| 2011/0005384 A1 | 1/2011 | Lewis et al. |
| 2011/0016762 A1 | 1/2011 | Davies |
| 2011/0061281 A1 | 3/2011 | Kapusta et al. |
| 2011/0094373 A1 | 4/2011 | Cassels |
| 2011/0173863 A1 | 7/2011 | Ingram |
| 2011/0174148 A1 | 7/2011 | Sy |
| 2011/0209377 A1 | 9/2011 | Davies |
| 2011/0220088 A1 | 9/2011 | Maggiore |
| 2011/0247254 A1 | 10/2011 | Barnes |
| 2012/0000109 A1 | 1/2012 | Zusman |
| 2012/0030983 A1 | 2/2012 | Kuczynko et al. |
| 2012/0030987 A1 | 2/2012 | Lee, III |
| 2012/0042557 A1 | 2/2012 | Gomez et al. |
| 2012/0073177 A1 | 3/2012 | Laney et al. |
| 2012/0079752 A1 | 4/2012 | Peterson et al. |
| 2012/0111183 A1 | 5/2012 | Hochstrate et al. |
| 2012/0132068 A1 | 5/2012 | Kucynko |
| 2012/0137556 A1 | 6/2012 | Laney et al. |
| 2012/0137562 A1 | 6/2012 | Langevin et al. |
| 2012/0137869 A1 | 6/2012 | Gomez et al. |
| 2012/0137872 A1 | 6/2012 | Crommett |
| 2012/0152105 A1 | 6/2012 | Gomez et al. |
| 2012/0167424 A1 | 7/2012 | Gomez |
| 2012/0180354 A1 | 7/2012 | Sullivan et al. |
| 2012/0186123 A1 | 7/2012 | Troy et al. |
| 2012/0204713 A1 | 8/2012 | Patel |
| 2012/0222344 A1 | 9/2012 | Werner |
| 2012/0260793 A1 | 10/2012 | Gomez |
| 2013/0055613 A1 | 3/2013 | Gomez et al. |
| 2013/0068089 A1 | 3/2013 | Brown |
| 2013/0097911 A1 | 4/2013 | Larue |
| 2013/0152443 A1 | 6/2013 | Gomez et al. |
| 2013/0174457 A1 | 7/2013 | Gangl et al. |
| 2013/0192114 A1 | 8/2013 | Christenson |
| 2013/0205637 A1 | 8/2013 | Patel |
| 2013/0263732 A1 | 10/2013 | Kucynko |
| 2013/0269232 A1 | 10/2013 | Harris et al. |
| 2013/0269510 A1 | 10/2013 | Sullivan |
| 2014/0026459 A1 | 1/2014 | Yan et al. |
| 2014/0026744 A1 | 1/2014 | Gomez et al. |
| 2014/0033590 A1 | 2/2014 | Gomez |
| 2014/0041518 A1 | 2/2014 | Neitzling |
| 2014/0060293 A1 | 3/2014 | Gomez |
| 2014/0060509 A1 | 3/2014 | Tseng |
| 2014/0068987 A1 | 3/2014 | Burt |
| 2014/0075817 A1 | 3/2014 | Gomez |
| 2014/0076144 A1 | 3/2014 | Gomez |
| 2014/0076146 A1 | 3/2014 | Gomez |
| 2014/0090283 A1 | 4/2014 | Gomez |
| 2014/0163664 A1 | 6/2014 | Goldsmith |
| 2014/0190056 A1 | 7/2014 | Troy et al. |
| 2014/0230642 A1 | 8/2014 | Reynolds et al. |
| 2014/0259843 A1 | 9/2014 | Matteson |
| 2014/0260946 A1 | 9/2014 | Gomez |
| 2014/0373415 A1 | 12/2014 | Faifer |
| 2015/0027427 A1 | 1/2015 | Maeda |
| 2015/0075052 A1 | 3/2015 | Boyarkin |
| 2015/0260469 A1 | 9/2015 | Gomez |
| 2015/0323269 A1 | 11/2015 | McGinty |
| 2015/0330728 A1 | 11/2015 | McGinty |
| 2015/0345895 A1 | 12/2015 | Young |
| 2016/0047612 A1 | 2/2016 | Sullivan et al. |
| 2016/0069636 A1 | 3/2016 | Gomirato et al. |
| 2016/0116240 A1 | 4/2016 | Gomez |
| 2016/0116249 A1 | 4/2016 | Maugham |
| 2016/0305738 A1 | 10/2016 | Huang et al. |
| 2016/0370135 A1 | 12/2016 | Plumb et al. |
| 2017/0023328 A1 | 1/2017 | Irvin et al. |
| 2017/0108303 A1 | 4/2017 | Gomez |
| 2017/0115078 A1 | 4/2017 | Plumb |
| 2017/0160027 A1 | 6/2017 | Gangl |
| 2017/0205190 A1 | 7/2017 | Jen et al. |
| 2017/0219311 A1 | 8/2017 | Reavis, III |
| 2017/0241737 A1 | 8/2017 | Keller, II |
| 2017/0321978 A1 | 11/2017 | Brannan et al. |
| 2017/0328672 A1 | 11/2017 | Hewes et al. |
| 2018/0066906 A1 | 3/2018 | Gomez |
| 2018/0119721 A1 | 5/2018 | Gomez |
| 2018/0156568 A1 | 6/2018 | Troy et al. |
| 2019/0017777 A1 | 1/2019 | Wilson et al. |
| 2019/0063867 A1 | 2/2019 | Gomez |
| 2019/0195581 A1 | 6/2019 | Cassels |
| 2019/0293379 A1 | 9/2019 | Taylor |
| 2020/0018564 A1 | 1/2020 | Gomez |
| 2020/0096268 A1 | 3/2020 | Lage |
| 2020/0240726 A1 | 7/2020 | Spangler et al. |

OTHER PUBLICATIONS

U.S. Pat. No. 10,598,452, Mar. 24, 2020, Gomez.
U.S. Pat. No. 10,591,245, Mar. 17, 2020, Gomez.
U.S. Pat. No. 10,309,739, Jun. 4, 2019, Gomez.
U.S. Pat. No. 10,240,883, Mar. 26, 2019, Gomez.
U.S. Pat. No. 9,915,497, Mar. 13, 2018, Gomez.
U.S. Pat. No. 9,816,546, Nov. 14, 2017, Gomez.
U.S. Pat. No. 9,810,495, Nov. 7, 2017, Gomez.
U.S. Pat. No. 9,772,150, Sep. 26, 2017, Gomez.
U.S. Pat. No. 9,658,011, May 23, 2017, Gomez.
U.S. Pat. No. 9,625,232, Apr. 18, 2017, Gomez.
U.S. Pat. No. 9,506,711, Nov. 29, 2016, Gomez.
U.S. Pat. No. 9,506,702, Nov. 29, 2016, Gomez.
U.S. Pat. No. 9,291,414, Mar. 22, 2016, Gomez.
U.S. Pat. No. 9,140,506, Sep. 22, 2015, Gomez.
U.S. Pat. No. 8,950,312, Feb. 10, 2015, Gomez.
U.S. Pat. No. 8,943,947, Feb. 3, 2015, Gomez.
U.S. Pat. No. 8,844,424, Sep. 30, 2014, Gomez.
U.S. Pat. No. 8,783,159, Jul. 22, 2014, Gomez et al.
U.S. Pat. No. 8,746,125, Jun. 10, 2014, Gomez et al.
U.S. Pat. No. 8,689,477, Apr. 8, 2014, Gomez et al.
U.S. Pat. No. 8,387,513, Mar. 5, 2013, Gomez et al.
U.S. Pat. No. 8,375,616, Feb. 19, 2013, Gomez et al.
U.S. Pat. No. 8,342,075, Jan. 1, 2013, Gomez.
U.S. Pat. No. 8,141,289, Mar. 27, 2012, Gomez et al.
U.S. Pat. No. 7,461,581, Dec. 9, 2008, Leitner-Wise.
U.S. Pat. No. 7,313,883, Jan. 1, 2008, Gomez.
D735288, Jul. 28, 2015, Gomez.
D712998, Sep. 9, 2014, Gomez.
D641451, Jul. 12, 2011, Gomez et al.
US-2020-0386508, Dec. 10, 2020, Gomez.
US-2020-0166303, May 28, 2020, Gomez.
US-2020-0018564, Jan. 16, 2020, Gomez.
US-2018-0119721, May 3, 2018, Gomez.
U.S. Appl. No. 61/925,783, filed Jan. 10, 2014, Gomez.
U.S. Appl. No. 61/524,500, filed Aug. 17, 2011, Gomez.
U.S. Appl. No. 16/748,058, filed Feb. 6, 2020, Gomez.
U.S. Appl. No. 16/784,058, filed Feb. 6, 2020, Gomez.
U.S. Appl. No. 12/381,240, filed Mar. 10, 2009, Gomez.
U.S. Appl. No. 11/497,141, dated Jan. 23, 2008, Office Action in the U.S. Patent and Trademark Office.
U.S. Appl. No. 15/332,143, dated Feb. 21, 2020, Notice of Allowance in the U.S. Patent and Trademark Office.
U.S. Appl. No. 11/188,734, dated Aug. 10, 2007, Notice of Allowance in the U.S. Patent and Trademark Office.
U.S. Appl. No. 11/491,141, dated Jan. 23, 2008, Office Action in the U.S. Patent and Trademark Office.

(56) References Cited

OTHER PUBLICATIONS

U.S. Appl. No. 11/491,141, dated Aug. 13, 2008, Notice of Allowance in the U.S. Patent and Trademark Office.
U.S. Appl. No. 11/825,221, dated Feb. 5, 2010, Office Action in the U.S. Patent and Trademark Office.
U.S. Appl. No. 11/825,221, dated Jun. 18, 2010, Notice of Allowance in the U.S. Patent and Trademark Office.
U.S. Appl. No. 12/217,874, dated Jan. 4, 2011, Office Action in the U.S. Patent and Trademark Office.
U.S. Appl. No. 12/217,874, dated Oct. 12, 2011, Notice of Allowance in the U.S. Patent and Trademark Office.
U.S. Appl. No. 12/217,874, dated Oct. 12, 2011, Requirement for Restriction/Election in the U.S. Patent and Trademark Office.
U.S. Appl. No. 12/217,874, dated Nov. 15, 2011, Notice of Allowance in the U.S. Patent and Trademark Office.
U.S. Appl. No. 12/316,241, dated Feb. 7, 2011, Office Action in the U.S. Patent and Trademark Office.
U.S. Appl. No. 12/316,241, dated Oct. 12, 2011, Final Office Action in the U.S. Patent and Trademark Office.
U.S. Appl. No. 12/316,241, dated May 1, 2012, Office Action in the U.S. Patent and Trademark Office.
U.S. Appl. No. 12/316,241, dated Sep. 27, 2012, Requirement for Restriction/Election in the U.S. Patent and Trademark Office.
U.S. Appl. No. 12/316,241, dated Oct. 12, 2012, Notice of Allowance in the U.S. Patent and Trademark Office.
U.S. Appl. No. 12/381,240, dated Feb. 15, 2011 Office Action in the U.S. Patent and Trademark Office.
U.S. Appl. No. 12/381,240, dated Sep. 14, 2011, Final Office Action in the U.S. Patent and Trademark Office.
U.S. Appl. No. 12/801,001, dated Feb. 15, 2012, Requirement for Restriction/Election in the U.S. Patent and Trademark Office.
U.S. Appl. No. 12/801,001, dated Nov. 19, 2012, Notice of Allowance in the U.S. Patent and Trademark Office.
U.S. Appl. No. 13/419,202, dated Aug. 30, 2012, Notice of Allowance in the U.S. Patent and Trademark Office.
U.S. Appl. No. 13/430,281, dated Dec. 5, 2012, Office Action in the U.S. Patent and Trademark Office.
U.S. Appl. No. 13/430,281, dated Apr. 17, 2013, Notice of Allowance in the U.S. Patent and Trademark Office.
U.S. Appl. No. 13/430,281, dated Nov. 5, 2013, Notice of Allowance in the U.S. Patent and Trademark Office.
U.S. Appl. No. 13/562,651, dated Jun. 10, 2014, Requirement for Restriction/Election in the U.S. Patent and Trademark Office.
U.S. Appl. No. 13/562,651, dated Aug. 26, 2014, Office Action in the U.S. Patent and Trademark Office.
U.S. Appl. No. 13/562,651, dated Jul. 9, 2015, Final Office Action in the U.S. Patent and Trademark Office.
U.S. Appl. No. 13/562,663, dated Sep. 25, 2014, Office Action in the U.S. Patent and Trademark Office.
U.S. Appl. No. 13/562,663, dated May 12, 2015, Notice of Allowance in the U.S. Patent and Trademark Office.
U.S. Appl. No. 13/588,294, dated Mar. 28, 2014, Requirement for Restriction/Election in the U.S. Patent and Trademark Office.
U.S. Appl. No. 13/588,294, dated Sep. 24, 2014, Notice of Allowance in the U.S. Patent and Trademark Office.
U.S. Appl. No. 13/738,894, dated May, 7, 2014, Requirement for Restriction/Election in the U.S. Patent and Trademark Office.
U.S. Appl. No. 13/738,894, dated Dec. 3, 2014, Office Action in the U.S. Patent and Trademark Office.
U.S. Appl. No. 13/738,894, dated Dec. 15, 2015, Office Action in the U.S. Patent and Trademark Office.
U.S. Appl. No. 13/738,894, dated Aug. 3, 2016, Notice of Allowance in the U.S. Patent and Trademark Office.
U.S. Appl. No. 13/756,320, dated Jul. 12, 2013, Requirement for Restriction/Election in the U.S. Patent and Trademark Office.
U.S. Appl. No. 13/756,320, dated Sep. 11, 2013, Office Action in the U.S. Patent and Trademark Office.
U.S. Appl. No. 13/756,320, dated Jan. 27, 2014, Notice of Allowance in the U.S. Patent and Trademark Office.
U.S. Appl. No. 13/769,224, dated Aug. 9, 2013, Requirement for Restriction/Election in the U.S. Patent and Trademark Office.
U.S. Appl. No. 13/769,224, dated Nov. 29, 2013, Office Action in the U.S. Patent and Trademark Office.
U.S. Appl. No. 13/769,224, dated Mar. 18, 2014, Notice of Allowance in the U.S. Patent and Trademark Office.
U.S. Appl. No. 13/837,697, dated Jul. 16, 2014, Requirement for Restriction/Election in the U.S. Patent and Trademark Office.
U.S. Appl. No. 13/837,697, dated Sep. 30, 2014, Notice of Allowance in the U.S. Patent and Trademark Office.
U.S. Appl. No. 13/841,618, dated May 27, 2014, Notice of Allowance in the U.S. Patent and Trademark Office.
U.S. Appl. No. 14/470,513, dated Feb. 4, 2016, Requirement for Restriction/Election in the U.S. Patent and Trademark Office.
U.S. Appl. No. 14/470,513, dated Jun. 30, 2016, Office Action in the U.S. Patent and Trademark Office.
U.S. Appl. No. 14/575,923, dated Jul. 9, 2017, Notice of Allowance in the U.S. Patent and Trademark Office.
U.S. Appl. No. 14/575,923, dated Jan. 15, 2016, Office Action in the U.S. Patent and Trademark Office.
U.S. Appl. No. 14/575,923, dated May 6, 2016, Final Office Action in the U.S. Patent and Trademark Office.
U.S. Appl. No. 14/575,923, dated Jan. 12, 2017, Final Office Action in the U.S. Patent and Trademark Office.
U.S. Appl. No. 14/577,503, dated Jun. 10, 2015, Requirement for Restriction/Election in the U.S. Patent and Trademark Office.
U.S. Appl. No. 14/577,503, dated Aug. 28, 2015, Office Action in the U.S. Patent and Trademark Office.
U.S. Appl. No. 14/577,503, dated Nov. 12, 2015, Notice of Allowance in the U.S. Patent and Trademark Office.
U.S. Appl. No. 14/593,513, dated Aug. 13, 2015, Office Action in the U.S. Patent and Trademark Office.
U.S. Appl. No. 14/593,513, dated Jan. 14, 2016, Final Office Action in the U.S. Patent and Trademark Office.
U.S. Appl. No. 14/844,886, dated Feb. 29, 2016, Office Action in the U.S. Patent and Trademark Office.
U.S. Appl. No. 15/058,488, dated Dec. 9, 2016, Notice of Allowance in the U.S. Patent and Trademark Office.
U.S. Appl. No. 15/332,143, dated Nov. 15, 2017, Requirement for Restriction/Election in the U.S. Patent and Trademark Office.
U.S. Appl. No. 15/332,143, dated Aug. 27, 2018, Office Action in the U.S. Patent and Trademark Office.
U.S. Appl. No. 15/332,143, dated Jun. 13, 2019, Final Office Action in the U.S. Patent and Trademark Office.
U.S. Appl. No. 15/332,143, dated Feb. 21, 2020-02-21, Notice of Allowance in the U.S. Patent and Trademark Office.
U.S. Appl. No. 15/471,808, dated Nov. 1, 2017, Notice of Allowance in the U.S. Patent and Trademark Office.
U.S. Appl. No. 15/589,708, dated Jan. 10, 2018, Office Action in the U.S. Patent and Trademark Office.
U.S. Appl. No. 15/589,708, dated Nov. 15, 2018, Notice of Allowance in the U.S. Patent and Trademark Office.
U.S. Appl. No. 15/596,834, dated May 17, 2018, Office Action in the U.S. Patent and Trademark Office.
U.S. Appl. No. 15/596,834, dated Jan. 23, 2019, Notice of Allowance in the U.S. Patent and Trademark Office.
U.S. Appl. No. 15/806,137, dated Nov. 1, 2018, Requirement for Restriction/Election in the U.S. Patent and Trademark Office.
U.S. Appl. No. 15/806,137, dated May 31, 2019, Office Action in the U.S. Patent and Trademark Office.
U.S. Appl. No. 15/806,137, dated Dec. 31, 2019, Notice of Allowance in the U.S. Patent and Trademark Office.
U.S. Appl. No. 15/811,404, dated Jan. 11, 2019, Requirement for Restriction/Election in the U.S. Patent and Trademark Office.
U.S. Appl. No. 15/811,404, dated Nov. 13, 2019, Office Action in the U.S. Patent and Trademark Office.
U.S. Appl. No. 15/811,404, dated Jun. 24, 2020, Notice of Allowance in the U.S. Patent and Trademark Office.
U.S. Appl. No. 15/918,935, dated Jan. 7, 2019, Requirement for Restriction/Election in the U.S. Patent and Trademark Office.
U.S. Appl. No. 15/918,935, dated Jul. 23, 2019, Office Action in the U.S. Patent and Trademark Office.

(56) References Cited

OTHER PUBLICATIONS

U.S. Appl. No. 15/918,935, dated Nov. 6 ,2019, Notice of Allowance in the U.S. Patent and Trademark Office.
U.S. Appl. No. 16/277,506, dated Oct. 25, 2019, Office Action in the U.S. Patent and Trademark Office.
U.S. Appl. No. 16/277,506, dated Sep. 21, 2020, Notice of Allowance in the U.S. Patent and Trademark Office.
U.S. Appl. No. 16/430,865, dated Sep. 17, 2020, Office Action in the U.S. Patent and Trademark Office.
U.S. Appl. No. 16/430,865, dated Apr. 1, 2021, Notice of Allowance in the U.S. Patent and Trademark Office.
U.S. Appl. No. 16/916,026, dated Aug. 9, 201, Requirement for Restriction/Election in the U.S. Patent and Trademark Office.
U.S. Appl. No. 29/371,221, dated Mar. 15, 2011, Office Action in the U.S. Patent and Trademark Office.
U.S. Appl. No. 29/371,221, dated May 31, 2011, Notice of Allowance in the U.S. Patent and Trademark Office.
U.S. Appl. No. 29/439,542, dated Jan. 30, 2014, Ex Parte Quayle Action in the U.S. Patent and Trademark Office.
U.S. Appl. No. 29/439,542, dated Sep. 23, 2014, Final Office Action in the U.S. Patent and Trademark Office.
U.S. Appl. No. 29/439,542, dated Apr. 9, 2015, Notice of Allowance in the U.S. Patent and Trademark Office.
U.S. Appl. No. 29/449,534, dated Apr. 25, 2014, Notice of Allowance in the U.S. Patent and Trademark Office.
12" LWRC REPR SBR, [online], [2011]. Retrieved from the Internet: <URL: http://forum.lwrci.com/viewtopic.php?f=35&t=10081.
Brownells, Inc., "Brownells—Barrel Extension Torque Tool," YouTube video [online], published Oct. 6, 2011, [retrieved on Aug. 9, 2018]. Retrieved from the Internet: <URL: www.youtube.com/watch?v=n4Y_JrfDcXU>.
Charlie Cutshaw, "Fal Fever!" Combat Tactics, www.surefire.com; Fall 2005; 14 pages.
David Crane, "LMT MRP Piston/Op-Rod System v. HK416: 2,000-Round Head-to-Head Test," Defense Review (www.defensereview.com); Feb. 23, 2009 (5 web pages), plus 6 enlarged photographs from the web pages. [Reprint of text retrieved Nov. 12, 2015, online], Retrieved from the Internet: <URL: http://www.defensereview.com/lmt-mrp-pistonop-rod-system-vs-hk416-2000-round-head-to-head-test/>.
Iannamico, "The U.S. Ordnance Department Tests the German FG-42," Journal Article: The Small Arms Review, 2007: vol. 10(9), pp. 83-88.
International Search Report for PCT/US07/16133 dated Nov. 6, 2008.
LWRC REPR 7.62mm Photo Gallery, [online], [retrieved on Nov. 5, 2009]. Retrieved from the Internet: <URL: http://www.xdtalk.com/forums/ar-talk/135060-lwrc-repr-7-62mm-photo-gallery.html.
Rob Curtis, "AAC's MPW "Honey Badger" don't care . . . ; " Military Times GearScout (http://blogs.militarytimes.com/gearscout/2011/10/15/aacs-mpw-h-oney-badger-dont-care/); Oct. 15, 2011 [Retrieved on May 17, 2013] (2 web pages), plus 4 enlarged photographs from the web pages.
Rob Curtis, Reaction Rod by Geissele Automatics, Military Times—Gear Scout, Oct. 12, 2012; , [online], [retrieved on Nov. 12, 2015]. Retrieved from the Internet: <URL: http://gearscout.militarytimes.com/2012/10/12/reaction-rod-by-geissele-automatics/>.
The Brownells Critical Tool Kit Website, "BROWNELLS—AR-15/M16 Critical Tools Kit," [online], [retrieved on Aug. 10, 2018]. Retrieved from the Internet: <URL: http://investors.maxwell.com/phoenix.zhtml?c=94560&p=irol-newsArticle&ID=1903210 URL: <www.brownells.com/gunsmith-tools-supplies/general-gunsmith-tools/gunsmithing-tool-kits/ar-15-m16-critical-tools-kit-prod41214.aspx>.

* cited by examiner

PRIOR ART

BARREL NUT ASSEMBLY AND METHOD TO ATTACH A BARREL TO A FIREARM USING SUCH ASSEMBLY

CROSS-REFERENCE TO RELATED APPLICATIONS

This application is a divisional of U.S. application Ser. No. 15/811,404 filed Nov. 13, 2017, which is a divisional of U.S. application Ser. No. 13/562,651 filed on Jul. 31, 2012, granted as U.S. Pat. No. 9,816,546. The entire contents of which are incorporated herein by reference in its entirety.

BACKGROUND OF THE INVENTION

1. Field of Invention

The invention relates in general, to firearms, and more particularly to barrel nut designs which ease installation of the barrel to the front end of the upper receiver and which offer structural features that improve the function of the associated gas operated firearm.

2. Description of the Related Art

Firearms in the M16 family, which include but are not limited to, the AR10, SR25, AR15, and piston driven systems and other similar designs, have been in use with military, police, and civilian shooters for nearly 50 years. The M16 family of firearms includes a lower receiver having a stock coupled to the rear end which is connected to an upper receiver having a barrel coupled to the front end. The chamber end of the barrel is received by a portion of the upper receiver and threadedly secured in place. The threads of the upper receiver which receive the barrel nut are not timed in any way but require a minimum torque of 30 foot pounds to secure the barrel in place. The outer surface of the barrel nut has a series of spokes, with gaps formed between, which are used to apply torque to the barrel nut. In order to properly install the gas operating system of the firearm, a gap in the spokes must be in alignment with an opening in the front of the upper receiver. This alignment is required because the gap between the spokes facilitates the entry of either a piston or a gas tube, of the gas operating system, into the interior of the upper receiver. To achieve this required alignment, the barrel nut is often either under- or over-torqued. Both of these conditions present a variety of potential problems which include, but are not limited to, damage to the firearm, poor accuracy during normal operation or compromised operational reliability.

Indirect gas operated M16 type rifles, often referred to as piston driven, such as the design described in U.S. Pat. No. 7,461,581 ("the '581 patent"), are becoming increasingly popular within both the commercial and military markets due to the increased operational reliability offered by such systems. The vast majority of these new piston driven designs rely on the prior art barrel nut common to the M16 family of firearms and as such have inherited the flaws of this design. In addition to the trouble which can result from improper torque being applied to the barrel nut, these piston designs depend on a moving piston, which is supported by the spokes of the barrel nut, to operate. However, the spokes of the barrel nut were not designed for this purpose and, as a result, present a weak point in the operational reliability of these new piston driven designs. Over time some systems which rely on the prior art barrel nut fail because the spokes which support the piston directly, or a removable bushing which houses the piston, start to bend or break, rendering the firearm inoperable. Therefore a need exists for a barrel nut design that will remedy the foregoing and other deficiencies inherent in the prior art.

SUMMARY OF THE INVENTION

Accordingly several objects and advantages of the present invention are:

(a) To overcome the disadvantages associated with the conventional barrel nut which can be under- or over-torqued in order to better accommodate the gas operating system;

(b) To provide a barrel nut assembly with an integral bushing to support a piston or to guide the gas tube of a gas operated firearm; and (c) To provide a barrel nut which is oriented about the barrel and receiver independently of the torque which is applied to secure the barrel in place.

In accordance with one embodiment of the present invention, a barrel nut assembly including a barrel nut and a locknut for coupling a barrel to the receiver of a firearm are provided. The barrel nut has internal threads and an external flange which is designed to be held in a fixture that is secured in a vice during barrel installation. The barrel nut body is designed to receive the threaded extension of the upper receiver in its back side and the chamber end of the barrel in its front side. An annular locknut, which has a central opening to receive the barrel, is used to secure the barrel to the host firearm's receiver. A preset torque value is applied to secure the locknut, and thereby the barrel, into place. While the locknut is being rotated, the barrel nut and upper receiver are held securely in a fixture which prevents the unintentional rotation and resulting misalignment of the barrel nut in relationship to the upper receiver. Further, the locknut places torque directly against a portion of the barrel, effectively compressing it against the front part of the upper receiver. The barrel nut assembly design and method of installation according to the present invention eliminate the problems inherent in the prior art as a result of applying an inappropriate torque value to a barrel nut in an effort to align the barrel nut with the gas tube of the firearm's operating system during barrel installation.

The body of the barrel nut also includes an integral bushing which is designed to receive and support a portion of a gas piston or gas tube of the firearm's operating system. Having a bore designed to be aligned with an opening present on the forward face of the upper receiver through which the operating rod passes, the integral bushing is structurally sound and will not bend or deform even after prolonged use of the host firearm. Accordingly the present invention provides a barrel nut assembly that affords the user with a method and apparatus for aligning the bushing bore with the upper receiver opening that is independent of the torque required to properly secure the barrel to the upper receiver.

Still further objects and advantages will become apparent from a consideration of the ensuing description and drawings where like reference numerals refer to corresponding elements throughout.

DESCRIPTION OF THE DRAWINGS

The characteristic features of the invention, together with further advantages thereof, will be better understood from the following description considered in connection with the accompanying drawings in which a preferred embodiment of the present invention is illustrated by way of example. It is to be expressly understood, however, that the drawings are for the purpose of illustration and description only and are not intended to define the limits of the invention.

DETAILED DESCRIPTION OF THE PREFERRED EMBODIMENT

The present invention is directed to a barrel nut assembly for use with the AR-10, AR-15, SR25, M16 variety and other derivatives to include those which use a gas piston in place of a conventional gas tube. Unless otherwise specified, the various components which make up the trigger mechanism, upper receiver assembly, lower receiver assembly, buttstock assembly, bolt assembly and barrel assembly are those found on the prior art M16 and M4 rifles and their various embodiments.

Figure 1:
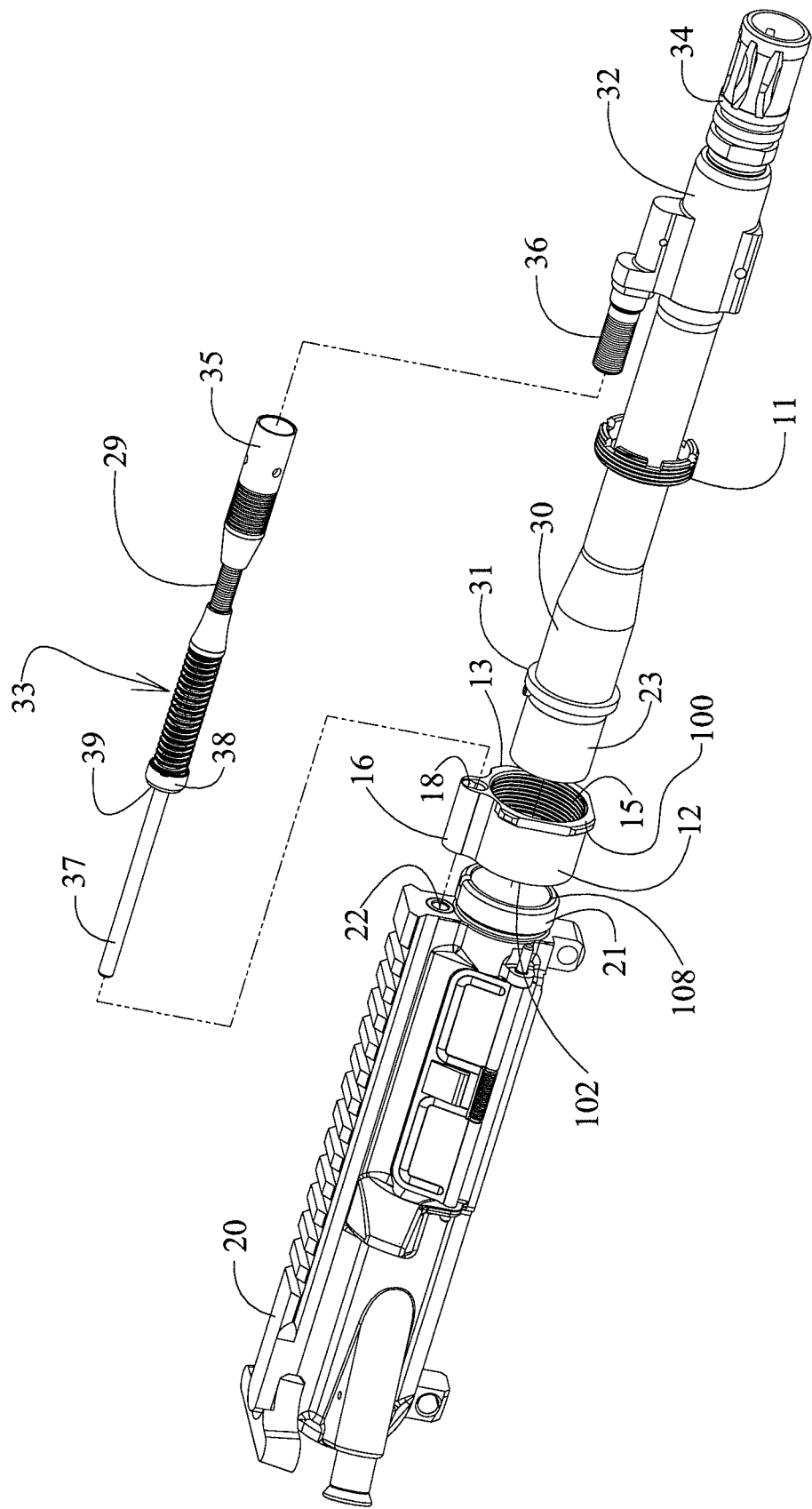
FIG. 1 is an exploded perspective view of an upper receiver with a barrel being secured with a barrel nut assembly in accordance with the present invention.

As used herein, the word "front" or "forward" corresponds to the end nearest the barrel (i.e., to the right as shown in FIG. 1); and "rear" or "rearward" or "back" corresponds to the direction opposite the end of the barrel, where the receiver is located (i.e., to the left as shown in FIG. 1).

The present invention is directed to a barrel nut assembly for securing a barrel to the front end of a receiver. In FIG. 1 there is illustrated an exploded perspective view of a firearm upper receiver group. Shown is the receiver 20 which has an opening 22 on its forward face and a threaded extension 21. The threaded extension 21 is configured to threadedly receive the rearward end of the barrel nut 12. The barrel 30 for the host firearm is shown with a flash hider 34 and gas block 32 installed at its forward end. The construction of the barrel 30 is of a conventional M16 type. The rearward or chamber end 23 of the barrel 30 has an annular flange 31.

The piston assembly, generally designated by reference numeral 33, incorporates a piston cup 35 at its forward end, an operating rod 37 at the back end and a connecting rod 29 located therebetween. The gas block 32 incorporates a gas nozzle 36 which is received by the piston cup 35. The piston assembly 33 and the gas nozzle 36 are components of the operating system being used with the preferred embodiment. The specific components and features which make up the piston assembly 33 and the gas nozzle 32, along with the methods of their installation, are described in the '581 patent and co-pending, commonly owned, patent application U.S. Ser. No. 12/801,001, which are expressly incorporated by reference as if fully set forth herein. Any manner in which the piston assembly 33 and the gas nozzle 36 differ from '581 patent will be disclosed herein.

Figure 2:
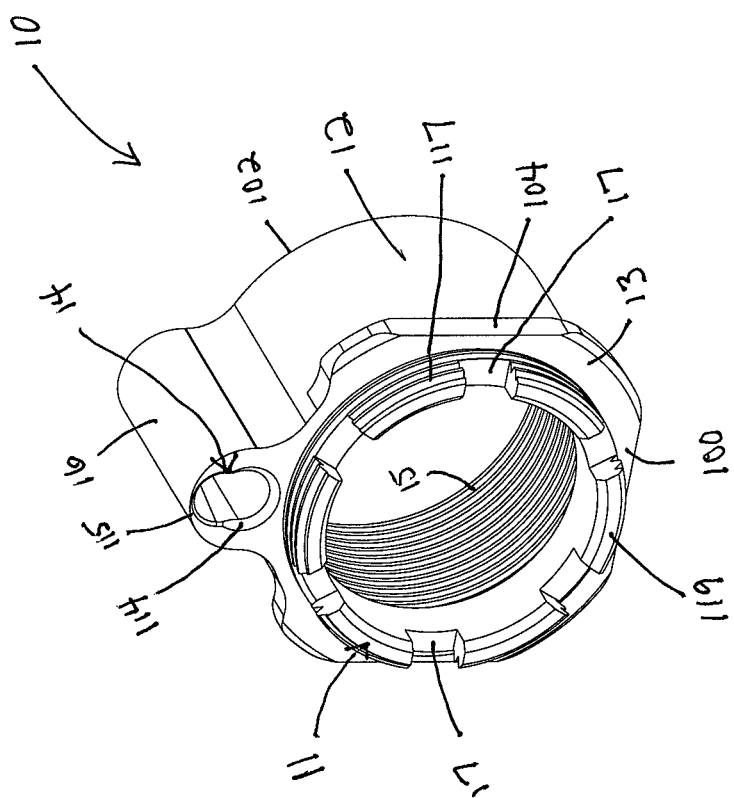
FIG. 2 is an illustration of a barrel nut assembly in accordance with the present invention.

As shown in isolation in FIG. 2, the barrel nut assembly, generally designated by reference number 10, includes the barrel nut 12, and a locknut generally designated by reference numeral 11. The barrel nut 12 has a threaded longitudinal bore 15 that extends from a front end 100 of the barrel nut to the rear end 102 thereof. As shown in FIG. 1, the front end 100 of the barrel nut 12 receives the rear or chamber end of a barrel 30, while the rear end 102 of the barrel nut is threadedly secured to the front extension 21 of the receiver 20.

Figure 3:
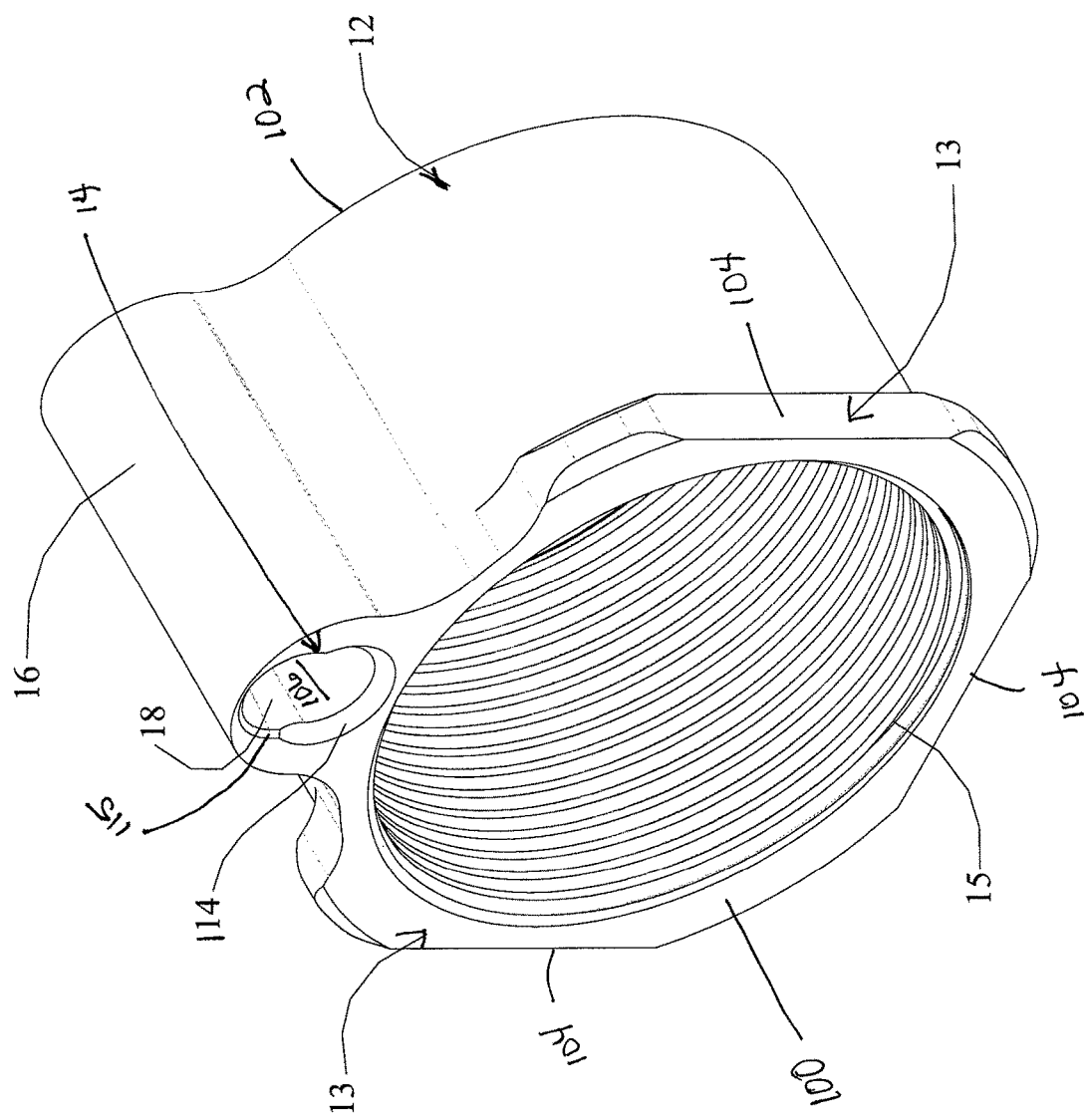
FIG. 3 is a front end perspective view of the barrel nut of the barrel nut assembly shown in FIG. 2.

The barrel nut 12, shown best in FIG. 3, also incorporates an integral bushing 16 mounted longitudinally along the top surface of its exterior. The bushing 16 has a through bore 18 that is generally parallel with the longitudinal bore 15 and defines an inner wall 106 through which the operating rod 37 of the firearm passes during normal operation of the host firearm. The bushing 16 provides a robust support structure for the operating rod 37 and other components of the gas operating system of the host firearm.

Figure 3A:
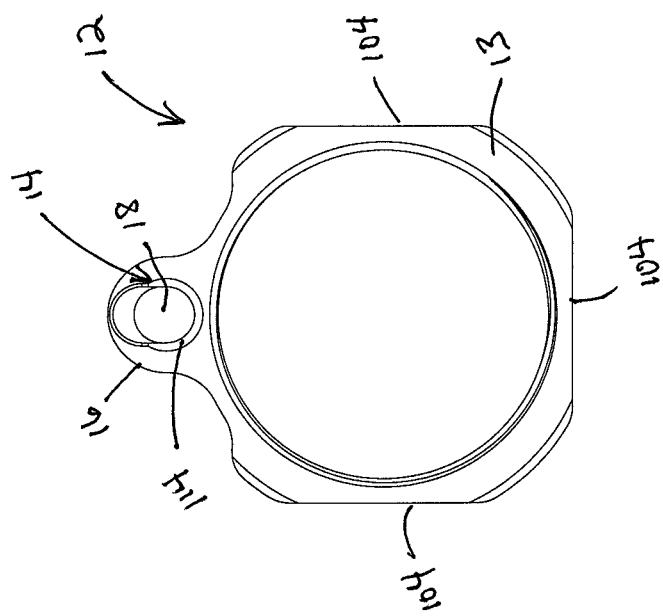
FIG. 3A is a front end view of the barrel nut shown in FIG. 1.

The forward end 100 of the barrel nut includes an exterior flange 13, best shown in FIG. 3A, having at least two and preferably three squared off sections 104 spaced 90° apart to render the forward face of the barrel nut essentially square. These squared off sections 104 are configured to be received within and captured by a fixture (see FIGS. 7A and 7B) used to lock the receiver and barrel nut in place to prevent rotation thereof when mounting the barrel, as will be described hereinafter.

The opening edge 14 about at least the bottom portion 114 of the entrance into the through bore 18 of the bushing 16 is chamfered. In the illustrated embodiment, the opening edge is chamfered all the way around, with the chamfered bottom portion 114 of the edge 14 of the through bore 18 being more substantial than the chamfer extending about the top portion 115 of the through bore 18. This opening edge 14 is configured to receive and support the chamfered rear end 39 of spring cup 38 during and upon installation of the piston assembly 33 shown in FIG. 5. The chamfering of the edge 14 provides "wiggle room" which aids in the installation of the piston assembly. It should also be understood that the opening edge 14 about the face of the through bore 18 can support or be modified to support, spring cup equivalents or the springs of other piston-operated firearms. In general, the opening edge 14 of the through bore 18 of the barrel nut bushing 16 is designed to provide a robust structure to support the spring cup 38 or return spring of a piston driven firearm and provide a surface for it to press against during operation.

Figure 4:
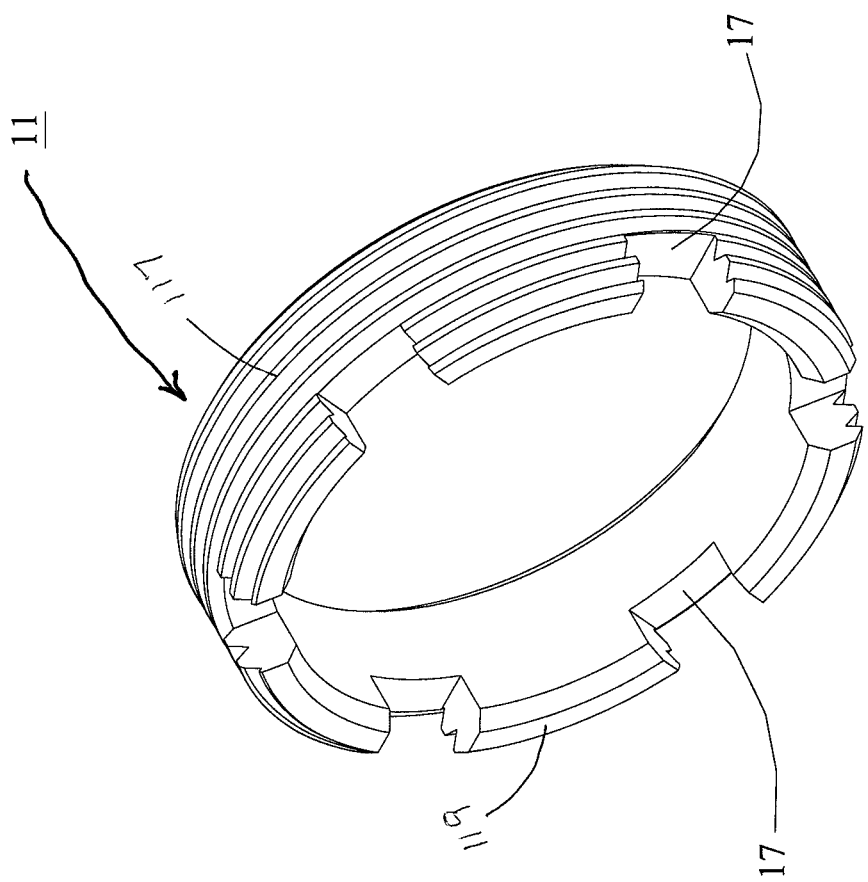
FIG. 4 is a front end perspective view of the locknut of the barrel nut assembly shown in FIG. 2.

FIG. 4 shows an isolated front end perspective view of the locknut 11 of the barrel nut assembly. The locknut has threads 117 about its exterior that are configured to enable the locknut 11 to be threadedly received into the threaded bore 15 of the barrel nut 12 during assembly. The locknut includes a grippable structure preferably embodied as a plurality of cutouts or grooves 17 spaced evenly about the forward face 119 of the locknut 11. These grooves 17 are configured to engage with a complementary gripping structure on a wrench 40 (shown in FIG. 6) which is used to apply torque to the locknut 11 during assembly. The locknut 11 secures the barrel 30 to the barrel nut 12 and to the upper receiver. Because torque is applied to the locknut while the barrel nut is held stationary in the fixture, the barrel nut assembly in accordance with the present invention allows for consistent torque to be used when securing the barrel 30 in place.

Figure 5:
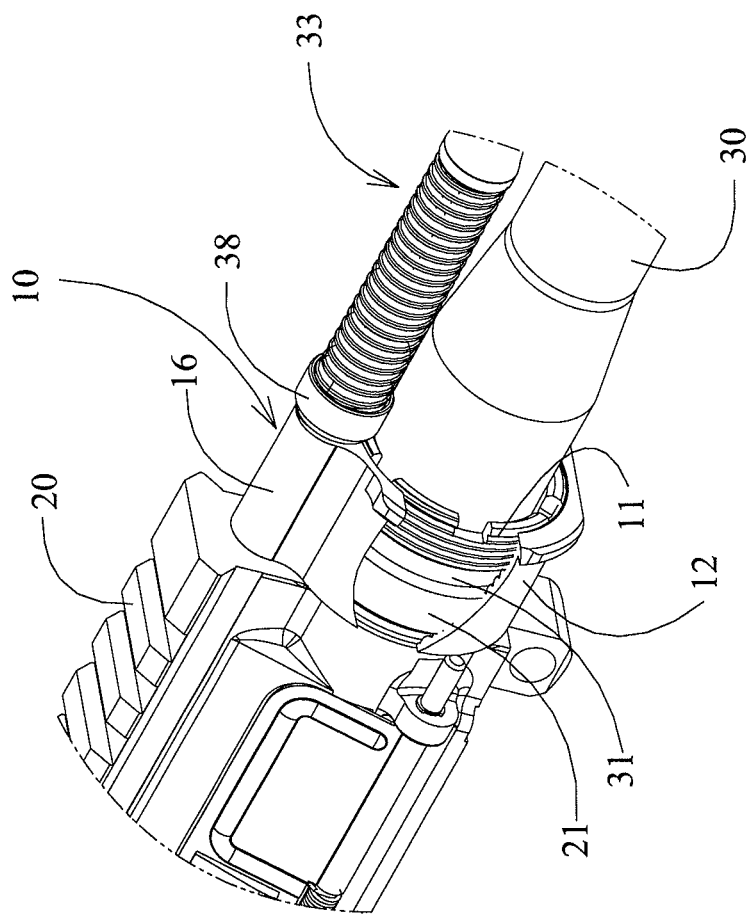
FIG. 5 is a detailed side cutaway view showing the barrel nut assembly according to the present invention in use.

FIG. 5 shows a side cutaway view of upper receiver 20 with barrel 30 being retained by the barrel nut 12 and lock nut 11 of the barrel nut assembly 10 according to the present invention. After threading the barrel nut 12 onto the threaded extension 21 of the receiver 20, the rearward end of the barrel 30 is inserted into the threaded bore 15 of the barrel nut 12. When mounted, the back side of the annular flange 31 of the barrel 30 is aligned with and seated against the forward face 108 of the receiver's threaded extension 21. The locknut 11 is threaded into the threaded bore 15 of the barrel nut and comes to rest against the front side of annular flange 31 when tightened, thereby retaining the barrel 30 in place.

Figure 6:
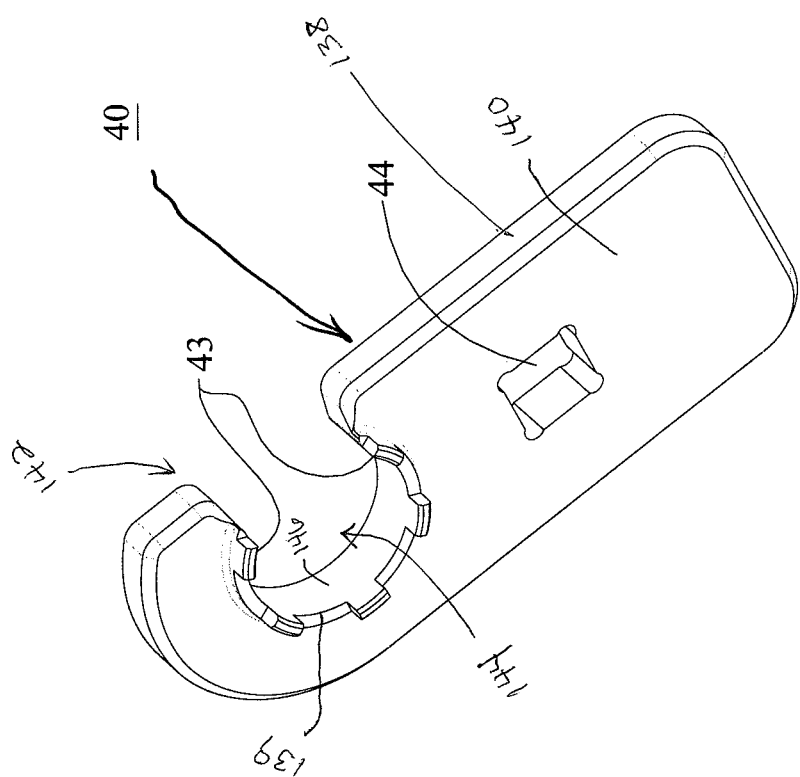
FIG. 6 is a perspective view of a specialized wrench used to secure the locknut against the annular flange on the barrel when securing the barrel to the upper receiver, as shown in FIG. 1, using the barrel nut assembly as shown in FIG. 2.

A specially designed wrench, generally designated by reference numeral 40, is used to secure the lock nut 11 to the barrel nut 12 as shown in FIG. 6. The wrench 40 has a body 138 with a crescent shaped head, generally designated by reference numeral 142, defining a C-shaped opening 144 with an inner periphery 146 about one end. The inner periphery includes a gripping structure embodied as a plurality of teeth 43 which project outwardly from the forward edge 139 of the inner periphery. The teeth 43 are generally perpendicular to the face 140 of one side of the wrench and are configured to engage with the grooves 17 on the front face of the lock nut 11 (see FIGS. 4 and 7A). The body 138 has an aperture 44 therein which is configured to receive the ½" drive member of any conventional socket or torque wrench. It is to be expressly understood that the aperture 44 which receives the drive member of the wrench could be constructed to receive any size or type of drive mechanism found on a wrench.

Figure 7A:
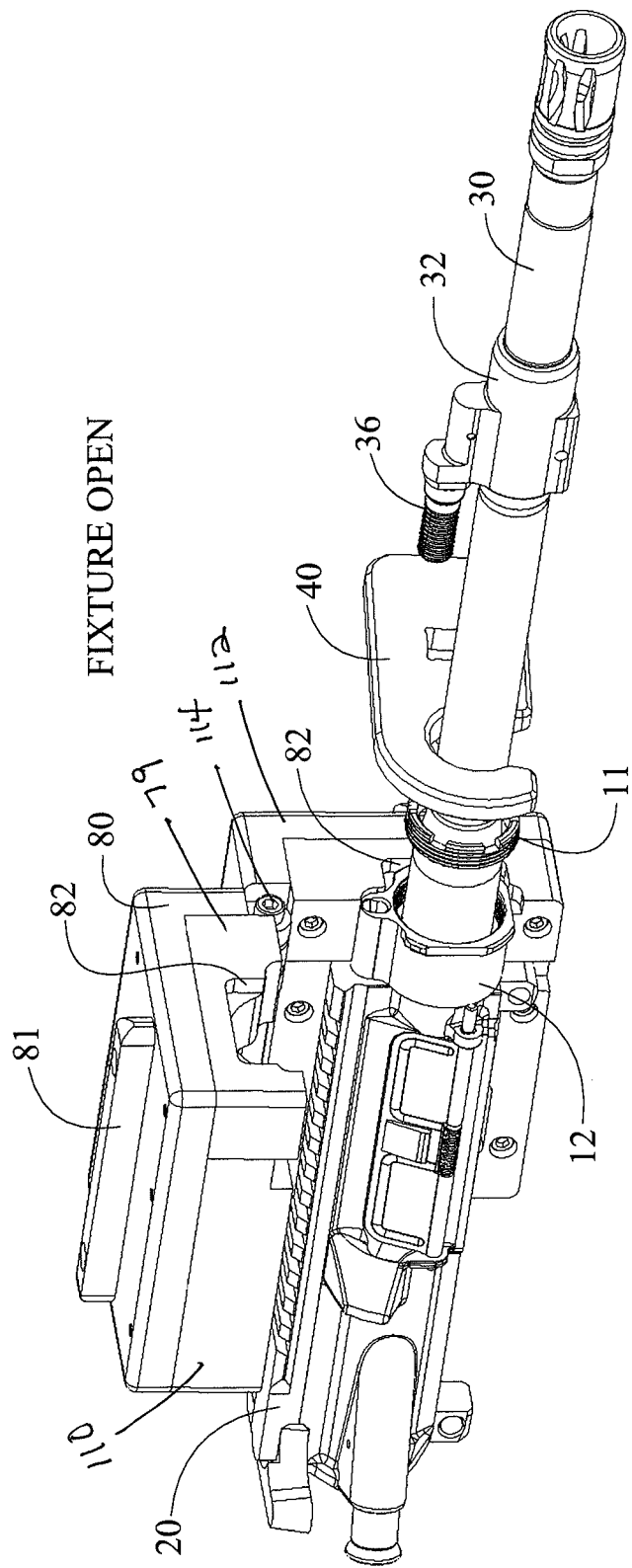
FIGS. 7A and 7B show side perspective views of a rifle equipped with the barrel nut of the present invention secured in a fixture, during installation of the lock nut, the fixture shown in the opened position in FIG. 7A and in the closed position in FIG. 7B.
Figure 7B:
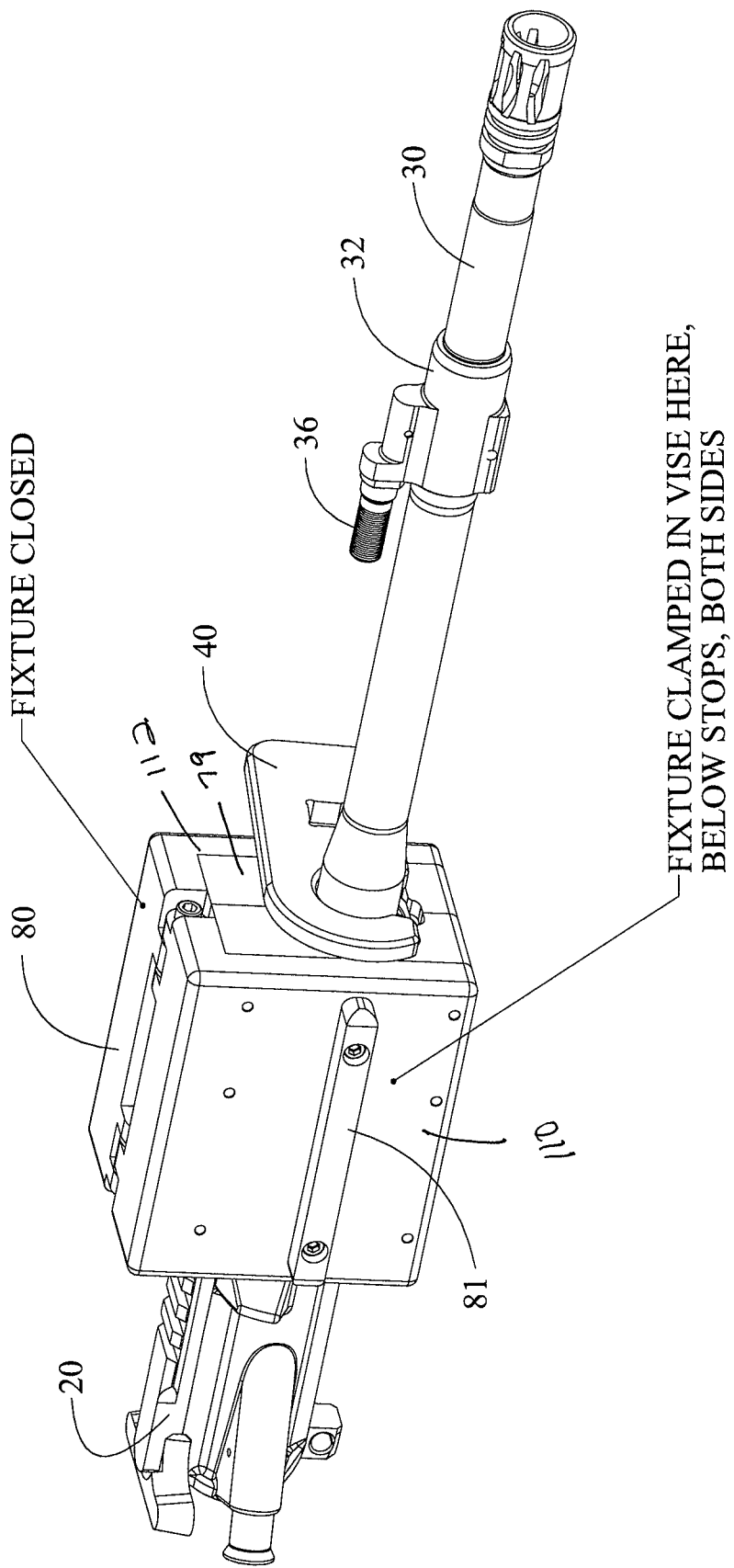

FIGS. 7A and 7B show a fixture 80 which, in a preferred embodiment, has two halves 110 and 112 interconnected by pivot rod 114. FIG. 7A shows the fixture in its open position to receive the upper receiver 20 of the firearm with a barrel nut 12 threaded into place. The interior of the fixture 80 is configured to receive and rotationally restrain the upper receiver 20 and the forward face 79 has a cutout 82 to rotationally restrain the barrel nut 12.

In particular, the fixture 80, which is shown in the opened position in FIG. 7A, has a cutout 82 about its forward face 79. The cutout 82 has two opposed sides and a bottom which form three sides of a square. The top or fourth side is recessed in order to accommodate the bushing 16. When the receiver and the barrel nut are positioned in the fixture, the three squared off sections 104 of the flange 13 are aligned with the three sides of the cutout 82. Therefore, when the halves 110, 112 are joined to place the fixture 80 in the closed position as shown in FIG. 7B, the cutout 82 effectively captures the squared off sections of the flange 13 on the forward face of the barrel nut 12 and prevents rotational movement of the barrel nut while the lock nut is being tightened within the barrel nut's longitudinal bore 15. The portion of the fixture 80 located below the stops 81 (as shown in FIG. 7B) is configured to be grasped by a vice (not shown) or similar apparatus which is used to hold the fixture 80 in place when the fixture is being used to restrain the upper receiver 20.

Figure 8:
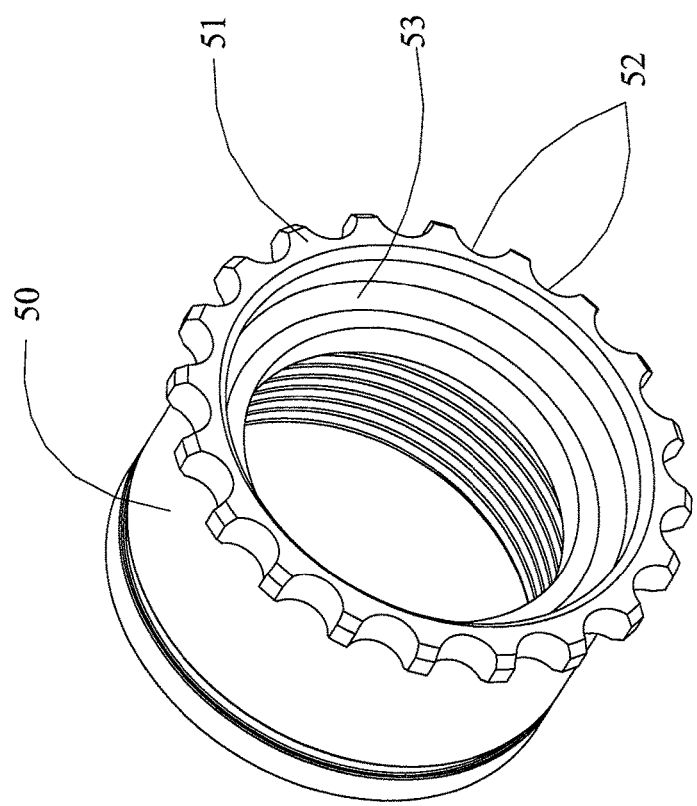
FIG. 8 is a perspective view of a prior art barrel nut.

A prior art barrel nut 50 is shown in FIG. 8. The prior art barrel nut 50 is configured to have a series of spokes 51 which define troughs 52 and an inner circumvolving edge 53 which holds the barrel 54, in connection with the barrel nut 50, in place on the upper receiver 55, shown in FIG. 9.

Figure 9:
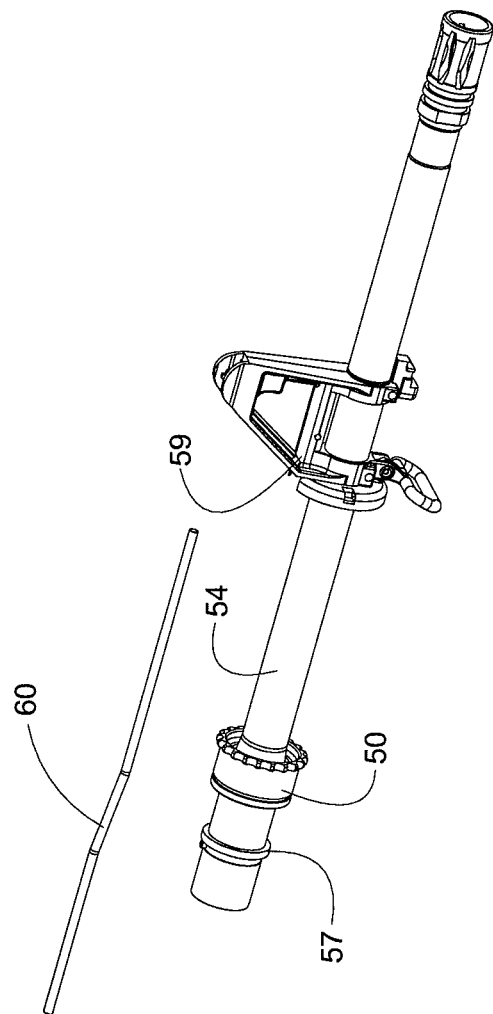
FIG. 9 is an exploded view of an upper receiver which uses a prior art barrel nut to secure the barrel to the receiver.
Figure 9:
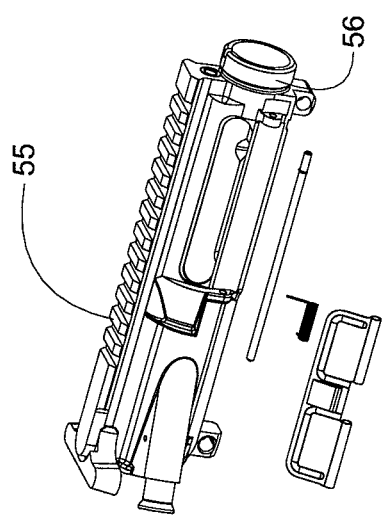

FIG. 9 illustrates an exploded view of a complete upper receiver assembly for an M16 type rifle using the prior art barrel nut 50 to secure the barrel 54 to the receiver 55. The rearward end of the barrel 54 is received by the threaded extension 56 of the receiver 55. The barrel nut 50 has a through bore which is configured to threadedly secure to the threads present on the threaded extension 56 of the receiver 55. The circumvolving edge 52 present within the interior of the barrel nut 50 secures the barrel 54 to the receiver 55 by placing force against the annular flange 57 of the barrel 54 and pushing it against the forward face of the threaded extension 56 of the receiver 55. There are a series of spokes 51 and troughs 52 present about the exterior of the barrel nut 50. When torque is being applied to the barrel nut 50 to secure the barrel 54 in place, the final positioning of the barrel nut has to place a trough 52 in alignment with an opening 58 present on the forward face of the receiver 55. When aligned with the opening 58 on the receiver, this trough allows the gas tube 60, or piston in some cases, to extend from the gas block 59 through the trough 52 and the opening 58 into the interior of the receiver 55 where the gas tube or piston is placed into communication with the bolt carrier, not shown but well known in the prior art.

If a spoke 51 of the prior art barrel nut is in line with the opening 58 on the receiver 55 when the barrel nut is torqued, the gas tube 60 cannot be properly installed, rendering the rifle inoperable. There is no effort to time the threads of the threaded extension 56 and the barrel nut 50 during the manufacturing process. As a result, during installation the barrel nut is often torqued into place multiple times in an attempt to properly align a trough 52 of the barrel nut with the opening 58 in the receiver 55. This can result in a situation where the alignment of a trough 52 with the opening in the receiver 55 will only occur by either over-torquing the barrel nut 50, under-torquing the barrel nut 50, or removing the barrel nut 50 entirely and starting over with a new barrel nut, which may have the same or a similar problem. In cases where the barrel nut 50 is over-torqued, the spokes 51, which are used in conjunction with a tool to apply torque to the barrel, can become brittle and break. This is a condition of particular concern when a piston is used in place of the gas tube 60, which is often supported on the spokes 51. Over-torquing the barrel nut 50 and thereby the barrel 54 can also negatively affect the accuracy of the host firearm.

To secure a barrel 30 to an upper receiver 20 of an M16 type firearm using the barrel nut assembly 10 in accordance with the present invention, the barrel nut 12 is threaded onto the threaded extension 21 of the upper receiver 20 until the barrel nut stops. The barrel nut is then reverse threaded until the through bore 18 of the bushing 16 is aligned with the opening 22 on the face of the receiver 20. The resulting subassembly of the upper receiver and the barrel nut is then placed within a fixture 80 which is secured within a vice to prevent any rotational movement of the barrel nut 12 and upper receiver 20. A barrel 30 of desired length is then selected, with the chamber end 23 thereof being inserted into the barrel nut 12 until the annular flange 31 of the barrel 30 is aligned with and comes to rest against the forward face 108 of the threaded extension 21 (see FIGS. 1 and 5). At the same time, the annular flange 31 is also contained within the interior of the barrel nut 12. The locknut 11 slides into and down the barrel and is then threadedly secured within the threaded bore 15 of the barrel nut 12. The locknut 11 is secured in place with the appropriate torque value using the wrench 40. The opening 144 of the wrench 40 is of sufficient size to fit about the barrel 30, and the teeth 43 around the periphery of the opening are constructed to interface with the grooves 17 on the forward face of the locknut 11. A secondary wrench with a drive is then used to apply a predetermined torque value to the locknut 11, thus securing the locknut 11 and thereby the barrel 30 into place. The gas block 32 and flash hider 34 are then installed onto the barrel 30, the manner of which is well known in the prior art.

The piston assembly 33 is assembled in essentially the same manner as described in the '581 patent. Initially, the piston cup 35 is independently placed on the gas nozzle 36. The rear end of the operating rod 37 is then inserted into the through bore 18 of the bushing 16 and into the opening 22 of the receiver 20 by grasping the forward end of the operating rod 37 and thereby compressing the spring of the piston assembly 33. With the spring compressed, the operating rod 37 may be rotated into a position which places it in line with the rearward face of the piston cup 35. While holding the operating rod 37 in its compressed position, the connecting rod 29 is then inserted into the opening (not shown) present on the forward end of the operating rod 37. This assembly is then aligned with the opening (not shown) present on the back side of the piston cup 35 and released so that a forward portion of the connecting rod 29 is received by the opening on the back side of the piston cup 35, thereby holding the operating rod 37, connecting rod 29, and piston cup 35 in operational alignment. The chamfered edge 14 present at the opening of the through bore 18 facilitates the initial insertion or removal of the operating rod 37. Thus the installation of the new barrel nut assembly 10 has been described. By reversing the steps outlined above the barrel nut assembly 10 may be removed.

Figure 10:
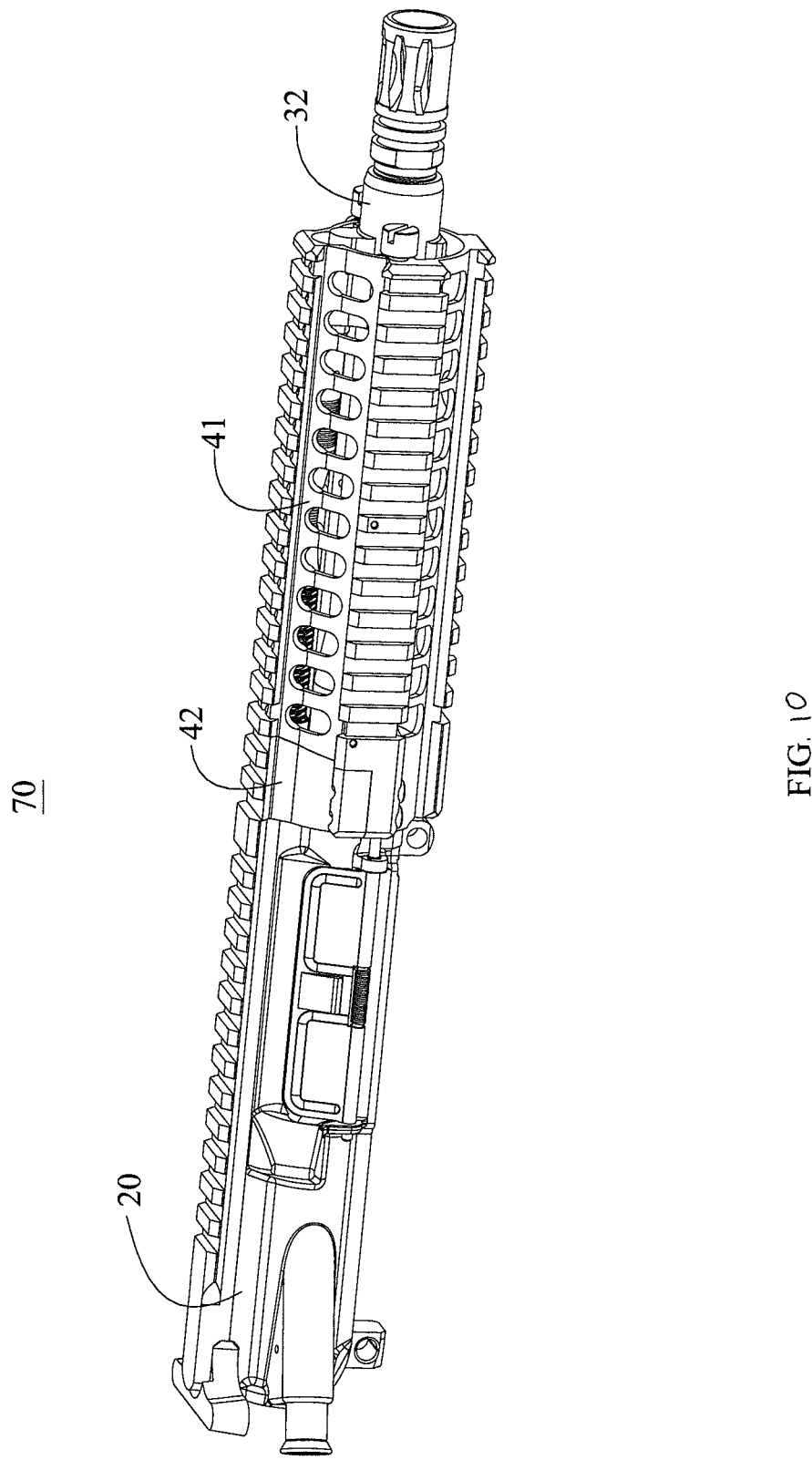
FIG. 10 is a side view of an upper receiver group using the barrel nut assembly of the present invention.

FIG. 10 shows a complete upper receiver and barrel assembly 70 consisting of an upper receiver 20 with a barrel 30 that has been secured in place through the use of the barrel nut assembly 10 described herein. A handguard 41, being secured to the barrel nut 12 through the use of a clamp 42, has been installed to protect the user's hand from direct contact with the barrel 30 while the firearm is being operated. This handguard is fully disclosed in copending application Ser. No. 12/217,874, commonly owned by the assignee of the instant application. The clamp 42 used herein to secure the handguard to the barrel nut 12 has been configured to accommodate the bushing 16 present on the barrel nut 12 described herein.

It should also be noted that the piston assembly 33, gas nozzle 36 and gas block 32 may easily be replaced with the gas block 59, gas tube 60 and other components of prior art gas operating systems without departing from the purpose and advantage of the barrel nut assembly 10 of the present invention as described herein.

CONCLUSION, RAMIFICATIONS, AND SCOPE

Accordingly, the barrel nut assembly according to the present invention provides an apparatus and method for securing a barrel to the receiver of a firearm. The barrel nut has an integral bushing 16 with a through bore 18 that is aligned with the opening 22 in the receiver so that the operating rod 37 of the piston assembly 33 may pass unhindered into the interior of the receiver. By supporting the operating rod of the piston assembly, the integral bushing provides a more robust means of supporting the operating rod and is not prone to structural failure as are the spokes of a conventional barrel nut, the disadvantages of which have been described above.

In addition, the provided method of orienting the through bore 18 of the bushing 16 with the opening 22 of the receiver is independent of the torque applied to the locknut used to secure the barrel to the receiver, offering the significant advantage of being able to use a consistent, preset torque value to secure the barrel to the receiver. This use of a consistent, preset torque value is an advantage as compared to prior art methods of securing a barrel to a receiver through the use of a conventional barrel nut.

While there is shown and described the present preferred embodiment of the invention, it is to be distinctly understood that this invention is not limited thereto but may be variously embodied without departing from the intended scope of the present invention. From the foregoing description, it will be apparent that various changes may be made without departing from the spirit and scope of the invention as defined by the following claims.

What is claimed is:

1. A barrel nut assembly for connecting a firearm barrel to a receiver of a gas operated rifle, said barrel nut assembly comprising:
   a barrel nut which is substantially cylindrical in shape and defines a longitudinally extending bore extending from a back end of said barrel nut along a longitudinal axis to a front end of the barrel nut, said bore having internal threads to be secured at the back end to an externally threaded front end part of the receiver, the front end of said bore being configured to receive a rear end portion of the firearm barrel therein, wherein said front end of the barrel nut has an integrally formed exterior flange having at least two squared off sections to render a forward face of the barrel nut substantially square, the at least two squared off sections configured to be captured within a fixture that rotationally restrains said barrel nut; and
   a locknut having external threads that engage with the internal threads in the barrel nut bore, enabling the locknut to be threadedly received within and connected to the barrel nut, said locknut being configured to compressively engage and secure said firearm barrel in position against said receiver as the locknut is screwed into the barrel nut and tightened to a preset torque value, a rotational orientation of said barrel nut about the barrel being independent of torque applied to the locknut.

2. The barrel nut assembly of claim 1, wherein the at least two squared off sections of the forward face of the barrel nut are spaced ninety degrees apart.

3. The barrel nut assembly of claim 1, wherein said barrel nut includes an integral support structure that includes a longitudinally extending bore configured to receive a portion of a gas operating system of the gas operated rifle.

4. The barrel nut assembly of claim 3, wherein said integral support structure includes a bushing positioned on a top side of said barrel nut having the longitudinally extending bore configured to receive the portion of the gas operating system of the gas operated rifle, wherein the portion of the gas operating system is a gas tube.

5. The barrel nut assembly of claim 1, wherein a forward face of said locknut includes a grippable structure configured to be engaged with a complementary gripping structure on a tool that is used to apply torque to said locknut.

6. The barrel nut assembly of claim 1, wherein a forward face of said locknut is provided with a plurality of spaced grooves configured to engage with correspondingly spaced teeth on a wrench which is used to apply torque to said locknut.

7. A gas operated firearm comprising:
   an upper receiver having a forward end with an externally threaded extension and an opening for receiving an operating rod of a gas operating system;
   a barrel having an annular flange proximate a rear end of said barrel; and
   a barrel nut assembly for connecting said barrel to said upper receiver, said barrel nut assembly including:
   an internally threaded barrel nut threadingly secured to said externally threaded extension of the receiver and a front end of the barrel nut being configured to receive the rear end of the barrel therein, said barrel nut having a throughbore adjacent to a periphery of said barrel nut that is aligned with said receiver opening to receive said operating rod therethrough, wherein the front end of the barrel nut has an integrally formed exterior flange having at least two squared off sections to render a forward face of the barrel nut substantially square, the at least two squared off sections configured to be captured within a fixture that rotationally restrains said barrel nut; and
   a locknut having external threads that engage with the internally threaded barrel nut to compressively engage and secure said barrel in position against said receiver, a back side of said barrel annular flange being seated against a forward face of the threaded extension of the receiver.

8. The gas operated firearm of claim 7, wherein the at least two squared off sections of the forward face of the barrel nut are spaced ninety degrees apart.

9. The gas operated firearm of claim 7, wherein a forward face of said locknut includes a grippable structure configured to be engaged with a complementary gripping structure on a tool that is used to apply torque to said locknut when compressively engaging and securing said barrel in position against said receiver.

10. The gas operated firearm of claim 7, wherein a forward face of said locknut is provided with a plurality of spaced grooves configured to engage with correspondingly spaced teeth on a wrench which is used to apply torque to said locknut when compressively engaging and securing said barrel in position against said receiver.

* * * * *